Patented Aug. 2, 1932

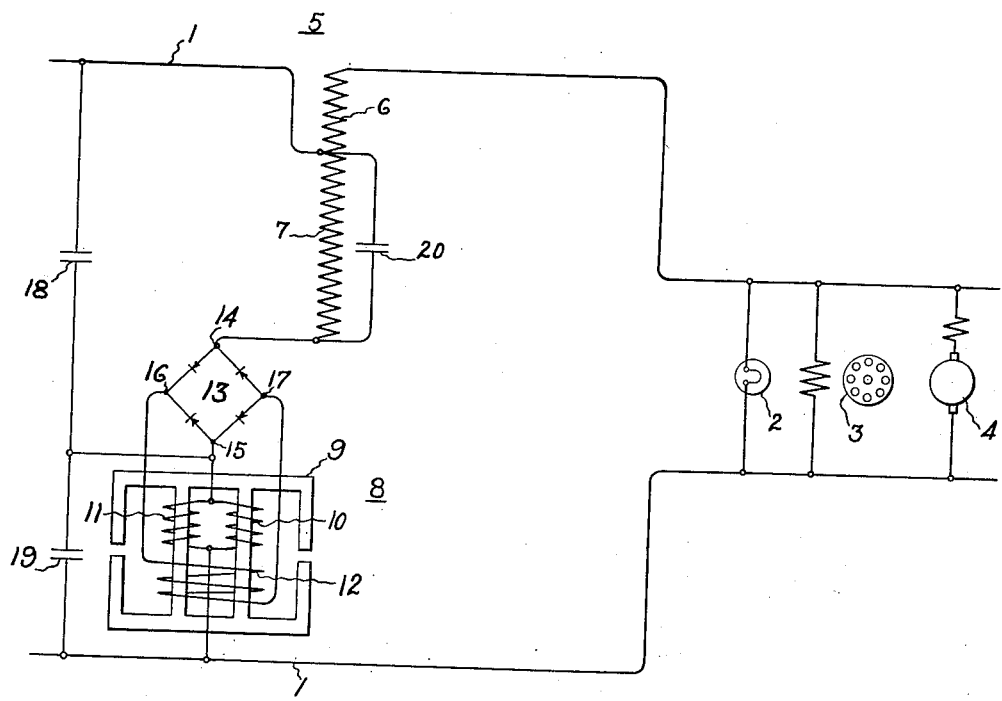
Inventors:
Aram Boyajian,
Earl V. De Blieux,
by Charles Mullan
Their Attorney.

1,870,093

UNITED STATES PATENT OFFICE

ARAM BOYAJIAN AND EARL V. DE BLIEUX, OF PITTSFIELD, MASSACHUSETTS, ASSIGNORS TO GENERAL ELECTRIC COMPANY, A CORPORATION OF NEW YORK

ELECTRICAL REGULATOR

Application filed April 29, 1930, Serial No. 448,398. Renewed December 24, 1931.

Our invention relates to electrical regulators and particularly to the automatic regulation of the voltage of alternating current feeder circuits.

The variations of the voltage drop in an alternating current circuit, such as a feeder circuit in secondary distribution networks, with variations in the current flow therethrough make desirable the use of voltage regulating means in connection with such circuits. This is especially true when such circuits supply current to incandescent lamps for it is well known that even a slight variation from rated voltage results in a considerable decrease in the efficiency of such devices from the standpoint of length of life if the voltage is high and from the standpoint of cost per unit of illumination if the voltage is low. In the past practically all such regulating means have involved the use of moving parts thus rendering them subject to all the disadvantages and disabilities of mechanisms of this type. In accordance with our invention we provide a regulator having no moving parts which operates on the principle of magnetic saturation. Regulators of the type having no moving parts may be referred to as static regulators.

An object of our invention is to provide a new and improved static regulator.

Another object of our invention is to provide a new and improved voltage regulator for alternating current feeder circuits which operates on the principle of magnetic saturation and which has no moving parts.

Our invention will be better understood from the following description taken in connection with the accompanying drawing and its scope will be pointed out in the appended claims.

Referring now to the single figure of the accompanying drawing, which is a diagrammatic showing of the preferred embodiment of our invention and in which 1 is an alternating current circuit, such as a feeder circuit of a secondary distribution network, which supplies energy to a variable load that is represented by way of illustration as an incandescent lamp 2, an induction motor 3 and an alternating current series commutator motor 4. Such load devices are typical of the ordinary feeder circuit load. For supplying the necessary voltage boost to circuit 1 so as to compensate for the drop in voltage in this circuit, and in the electrical apparatus supplying it with energy, with increases in load thereon, we employ a booster transformer 5, which may be of any suitable type, although we prefer to use an auto transformer as illustrated. This transformer which is shown diagrammatically has a series secondary winding 6 connected in circuit 1 and a shunt or primary winding 7 connected across circuit 1. For automatically varying the voltage across shunt winding 7 and hence the voltage boost induced in series winding 6, we employ a saturable reactor 8. Any type of reactor such as a simple single winding reactor on an iron core will suffice, although for reasons which will be hereinafter explained we prefer to use a reactor of the type shown having a separate direct current saturating winding. This reactor consists of a fourlegged core 9, two of whose legs are provided with air gaps. Separate alternating current windings 10 and 11 are wound on each of the continuous legs, while a direct current saturating winding 12 is wound so as to link both of said legs. Alternating current windings 10 and 11 are so arranged that their magnetic circuit does not contain either of the legs having air gaps. The result is that the instantaneous directions of the flux produced by the alternating coils in each of the continuous legs are opposite with respect to the direct current saturating winding 12 so that no voltage is induced therein. Another advantage of the specific construction illustrated is that the magneto-motive force produced by the direct current saturating winding is at any instant opposite with respect to the magneto-motive force of one alternating current winding and in the same direction as the magneto-motive force of the other alternating current winding so that the two halves of the alternating current wave passing through the reactor as a whole are not unequally distorted with the result that the production of even harmonics is prevented. The function of the air gaps in the magnetic circuit of the direct current saturating winding is to modify the operating characteristics of the reactor in that, due to their presence, a larger value of direct current in winding 12 will be necessary to produce saturation, and hence the saturation curve is straightened and its operating range is increased. For energizing the direct current saturating winding 12 we employ a rectifier 13 having alternating current input terminals 14 and 15 connected in the circuit with shunt winding 7 and the alternating current coils of reactor 8 and direct current output terminals 16 and 17 connected to winding 12. Rectifier 13 may be of any suitable type and as illustrated is of the dry disk copper oxide type. The advantage of connecting the alternating current terminals of the rectifier in the above described manner is that the current transformer which normally would be necessary if the rectifier were to be connected to be directly responsive to the current of circuit 1 is dispensed with.

For improving the operating characteristics of our regulating means in a manner to be hereafter explained, we connect a capacitor 18 in parallel with shunt winding 7 and rectifier 13, a capacitor 19 in parallel with the alternating current windings of reactor 8, and a capacitor 20 in parallel with shunt winding 7.

Ignoring for the time being the effect of capacitors 18, 19 and 20, and assuming that circuit 1 is connected to a suitable source of alternating current energy (not shown) and that the load on circuit 1 has just been increased, the operation of the embodiment of our invention which has just been described is as follows. As the increase in load is represented by an increase in current flow through circuit 1, and consequently through series winding 6, a corresponding increase in current flow must take place through shunt winding 7 due to the inductive relationship of these windings. This increased current flow passes through the saturating winding 12 as direct current and through alternating current reactor windings 10 and 11 as alternating current. As a consequence the ohmic reactance of reactor 8 decreases due to the decrease in its self-inductance as its core becomes saturated. The effect of the decrease in reactance of the reactor is to vary the relative relation of the voltage drops across it and across shunt winding 7 in such a way as to increase the voltage drop across shunt winding 7. The increase in voltage across shunt winding 7 causes an increase in voltage boost to be induced in series winding 6, thereby compensating for the increase in voltage drop in circuit 1 as a result of the increase in load. In a similar manner a decrease in load on circuit 1 decreases the saturation of reactor 8 thereby decreasing its exciting current, or, in other words, increasing its reactance so that the ratio of the voltage across it to the voltage across shunt winding 7 increases thereby decreasing the voltage boost in series winding 6.

From the above it will be clear that the ideal static regulator of this type comprising a boosting transformer and a saturable reactor in series with its primary winding for varying the voltage drop across the shunt winding should be such that at no load all, or practically all, of the total voltage of the circuit should be across the terminals of the reactor so that no appreciable voltage boost will be produced. To accomplish this, the flux density in the reactor should be low at no load and consequently a large reactor is desirable. In other words, at no load the exciting current of the auto transformer should be large in proportion to the exciting current of the reactor. Capacitor 18, which is connected across the shunt winding 7 and the rectifier, permits a larger current to flow through the reactor than through the auto transformer and thus permits the exciting current of the reactor to be increased without defeating the purpose of the apparatus. The purpose of capacitor 19, which is connected across reactor 8, is to cause a large leading current to be drawn through the shunt winding 7 of booster transformer 5 at no load so that under these conditions this current reverses the voltage of the secondary winding of transformer 5 and produces a voltage buck, or this current may be made sufficient to just neutralize the no load voltage boost of transformer 5, thereby increasing the range of operation of the apparatus. The purpose of capacitor 20, which is connected across shunt winding 7, is to increase the voltage boost of the apparatus when the load draws a high lagging current for such a current passing through capacitor 20 results in an increase in voltage across the terminals of this capacitor and hence across the terminals of primary winding 7. It will thus be seen that each one of capacitors 18, 19 and 20 has a separate and distinct function in improving the voltage regulation of the apparatus, but that they are not indispensable to its operation and that obviously any one or all three of them may be omitted if desired.

While we have shown and described a particular embodiment of our invention, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States, is,—

1. In combination, an alternating current circuit, a booster transformer including a series winding connected in said circuit and a shunt winding connected across said circuit, a rectifier and a saturable reactor connected in series with said shunt winding, a direct current saturating winding on said reactor, and means including said rectifier for energizing said saturating winding.

2. In combination, an alternating current circuit, a booster transformer connected thereto, a magnetically saturable reactor having an alternating current winding and a direct current winding, a rectifier having alternating current input terminals and direct current output terminals, means connecting the primary winding of said transformer in series with both the input terminals of said rectifier and the alternating current winding of said reactor, and means connecting said direct current winding to the output terminals of said rectifier.

3. In combination, an alternating current circuit, a booster transformer having a series boosting winding in said circuit and a shunt winding connected across said circuit, and a saturable reactor and a capacitor connected in parallel with each other and in series with said shunt winding.

4. In combination, an alternating current circuit, a booster transformer including a series voltage boosting winding connected in said circuit and a shunt winding connected across said circuit, a saturable reactor connected in series with said shunt winding, and a capacitor connected in parallel with said shunt winding.

5. In combination, an alternating current circuit, a booster transformer including a voltage booster winding connected in said circuit and a shunt winding connected across said circuit, a rectifier having alternating current input terminals and direct current output terminals, a saturable reactor having an alternating current winding and a direct current saturating winding, said shunt winding, the alternating current terminals of said rectifier and the alternating current winding of said reactor being connected in series, a capacitor connected in parallel with the portion of the shunt circuit including said shunt winding and the alternating current terminals of said rectifier said direct current saturating winding being connected to the direct current terminals of said rectifier.

6. In combination, an alternating current circuit, a voltage boosting transformer including a series winding connected in said circuit and a shunt winding connected across said circuit, a magnetically saturable reactor connected in series with said shunt winding, a capacitor connected in parallel with said shunt winding and a second capacitor connected in parallel with said saturable reactor.

7. In combination, an alternating current circuit, a booster transformer having a voltage boosting winding connecting in said circuit and a shunt winding connected across said circuit, a rectifier having alternating current input terminals and direct current output terminals, a magnetically saturable reactor having an alternating current winding and a direct current winding, said input terminals and alternating current winding being connected in series with said shunt winding, a capacitor connected in parallel with the alternating current winding of said reactor and a second capacitor connected in parallel with said series connected shunt winding and rectifier, the output terminals of said rectifier being connected to the direct current saturating winding of said reactor.

8. In combination, an alternating current circuit, a booster transformer having a voltage boosting winding connected in said circuit and a shunt winding connected across said circuit, a rectifier having alternating current input terminals and direct current output terminals, a magnetically saturable reactor having an alternating current winding and a direct current winding, said input terminals and alternating current winding being connected in series with said shunt winding, a capacitor connected in parallel with said shunt winding and a second capacitor connected in parallel with said series connected shunt winding and rectifier, the output terminals of said rectifier being connected to the direct current saturating winding of said reactor.

9. In combination, an alternating current circuit, a booster transformer having a voltage boosting series winding connected in said circuit and a shunt winding connected across said circuit, a rectifier, a magnetically saturable reactor having an alternating current winding and a direct current saturating winding, said shunt winding and the windings of said reactor being connected in series through said rectifier, a capacitor connected in parallel with said shunt winding, a second capacitor connected in parallel with said alternating current winding of said reactor, and a third capacitor connected in parallel with said shunt winding and rectifier.

10. In an electrical regulator, a magnetically saturable reactor comprising a four-legged core member, air gaps in two of said legs, separate alternating current windings on the two remaining legs, said windings being so wound that they have a common magnetic circuit, a direct current saturating winding linking both said last mentioned legs, said direct current winding having a magnetic circuit including said first mentioned legs.

11. In a system of distribution, in combination, an alternating current feeder circuit, a variable load connected thereto, a booster transformer connected to said circuit, means for varying the voltage across the primary winding of said transformer with variations in load on said circuit including a saturable reactor in series with said primary winding, said reactor having a direct current saturating winding, means in series with said primary winding and reactor for rectifying the current through them and passing said current through said saturable winding, said reactor having a pair of alternating current windings which are so connected as to induce no net voltage in said direct current winding, a capacitor connected across said primary winding, a second capacitor connected across the alternating current windings of said reactor, and a third capacitor connected across said primary winding and rectifier.

In witness whereof, we have hereunto set our hands this 25th day of April, 1930.

ARAM BOYAJIAN.
EARL V. DE BLIEUX.